US011977350B2

(12) United States Patent
Nakagawa et al.

(10) Patent No.: US 11,977,350 B2
(45) Date of Patent: May 7, 2024

(54) IMAGE FORMING APPARATUS

(71) Applicant: KYOCERA Document Solutions Inc., Osaka (JP)

(72) Inventors: Junichi Nakagawa, Osaka (JP); Tamotsu Shimizu, Osaka (JP); Hiroshi Yamazaki, Osaka (JP); Kenichi Tamaki, Osaka (JP); Takuji Watanabe, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 18/331,671

(22) Filed: Jun. 8, 2023

(65) Prior Publication Data

US 2023/0408973 A1 Dec. 21, 2023

(30) Foreign Application Priority Data

Jun. 16, 2022 (JP) ................................. 2022-097207

(51) Int. Cl.

| | |
|---|---|
| ***G03G 21/20*** | (2006.01) |
| ***G03G 15/00*** | (2006.01) |
| ***G03G 15/02*** | (2006.01) |
| ***G03G 15/06*** | (2006.01) |
| ***G03G 15/09*** | (2006.01) |

(Continued)

(52) U.S. Cl.

CPC ....... *G03G 21/206* (2013.01); *G03G 15/0266* (2013.01); *G03G 15/065* (2013.01); *G03G 15/09* (2013.01); *G03G 15/5008* (2013.01); *G03G 21/0047* (2013.01); *G03G 21/0052* (2013.01); *G03G 21/10* (2013.01); *G03G 21/105* (2013.01); *G03G 21/1814* (2013.01); *G03G 2215/00025* (2013.01); *G03G 2221/1645* (2013.01)

(58) Field of Classification Search

CPC .. G03G 15/0266; G03G 15/065; G03G 15/09; G03G 15/5008; G03G 21/0047; G03G 21/0052; G03G 21/10; G03G 21/105; G03G 21/1814; G03G 21/206; G03G 2215/00025; G03G 2221/1645

See application file for complete search history.

(56) References Cited

U.S. PATENT DOCUMENTS

2018/0032024 A1* 2/2018 Yamashita ............. G03G 21/10
2020/0326654 A1* 10/2020 Mizutani ................ G03G 21/10

(Continued)

FOREIGN PATENT DOCUMENTS

JP 2008-145826 A 6/2008

*Primary Examiner* — Joseph S Wong

(74) *Attorney, Agent, or Firm* — Stein IP, LLC

(57) ABSTRACT

An image forming apparatus includes an image carrier, a cleaning unit, a development device, and a control unit. The development device includes a toner collection mechanism having a developer carrier and a filter. The control unit is capable of executing a scattered toner recovery mode at non-image forming time, in which the filter is vibrated, a potential difference is generated in the direction for the toner to move from the developer carrier to the image carrier, the developer carrier is rotated in a reverse direction to that at image forming time, and the image carrier is rotated in the same direction as that at the image forming time, so that scattered toner, which has dropped from the filter and adhered to the developer carrier, is recovered by the cleaning unit via the image carrier.

5 Claims, 5 Drawing Sheets

(51) Int. Cl.

| | |
|---|---|
| ***G03G 21/00*** | (2006.01) |
| ***G03G 21/10*** | (2006.01) |
| ***G03G 21/18*** | (2006.01) |

(56) References Cited

U.S. PATENT DOCUMENTS

2022/0197186 A1* 6/2022 Harada .............. G03G 21/1832
2023/0408974 A1* 12/2023 Watanabe ............ G03G 21/206

* cited by examiner

IMAGE FORMING APPARATUS

INCORPORATION BY REFERENCE

This application is based upon and claims the benefit of priority from the corresponding Japanese Patent Application No. 2022-097207 filed Jun. 16, 2022, the entire contents of which are hereby incorporated by reference.

BACKGROUND

The present disclosure relates to an image forming apparatus.

An electrophotographic image forming apparatus such as a copier or a printer generally uses a device that supplies toner to an electrostatic latent image formed on an outer circumferential surface of an image carrier such as a photosensitive drum, so as to develop a toner image that is later transferred onto a paper sheet. In order to continuously form uniform images, the image forming apparatus stores developer containing toner in a development container, and stirs and conveys the developer inside the development container.

In a conventional image forming apparatus, it is concerned that the toner may scatter from inside to outside of the development container, and that the scattered toner may pollute the inside of the apparatus.

SUMMARY

An image forming apparatus according to one aspect of the present disclosure includes an image carrier, a charging unit, a cleaning unit, a development device, a voltage application unit, and a control unit. The image carrier forms an electrostatic latent image on its outer circumferential surface. The charging unit charges the outer circumferential surface of the image carrier. The cleaning unit cleans the outer circumferential surface of the image carrier. The development device includes a development container, a developer conveying member, and a developer carrier. The development container stores developer containing toner to be supplied to the image carrier. The developer conveying member is supported in a rotatable manner in a conveyance chamber of the development container, and stirs and conveys the developer so as to circulate the same. The developer carrier faces the image carrier and is supported in a rotatable manner by the development container so as to supply the toner in the conveyance chamber to the image carrier. The voltage application unit applies a development voltage to the developer carrier. The control unit controls the image carrier, the charging unit, the cleaning unit, the development device, and the voltage application unit. The development device includes a toner collection mechanism having a duct, a filter, an exhaust fan, and a vibration generating unit. The duct is connected to the conveyance chamber and allows air in the conveyance chamber to flow through. The filter is disposed at a connecting part between the duct and the conveyance chamber above the developer carrier, and collects the toner flowing into the duct from the conveyance chamber. The exhaust fan makes the air in the conveyance chamber flow outside via the duct. The vibration generating unit vibrates the filter. The control unit is capable of executing a scattered toner recovery mode at non-image forming time, in which the vibration generating unit vibrates the filter, the charging unit and the voltage application unit are controlled to generate a potential difference in the direction for the toner to move from the developer carrier to the image carrier, the developer carrier is rotated in a reverse direction to that at image forming time, and the image carrier is rotated in the same direction as that at the image forming time, so that scattered toner, which has dropped from the filter and adhered to the outer circumferential surface of the developer carrier, is recovered by the cleaning unit via the image carrier.

DETAILED DESCRIPTION

Hereinafter, an embodiment of the present disclosure is described with reference to the drawings. Note that the present disclosure is not limited to the description below.

Figure 1:
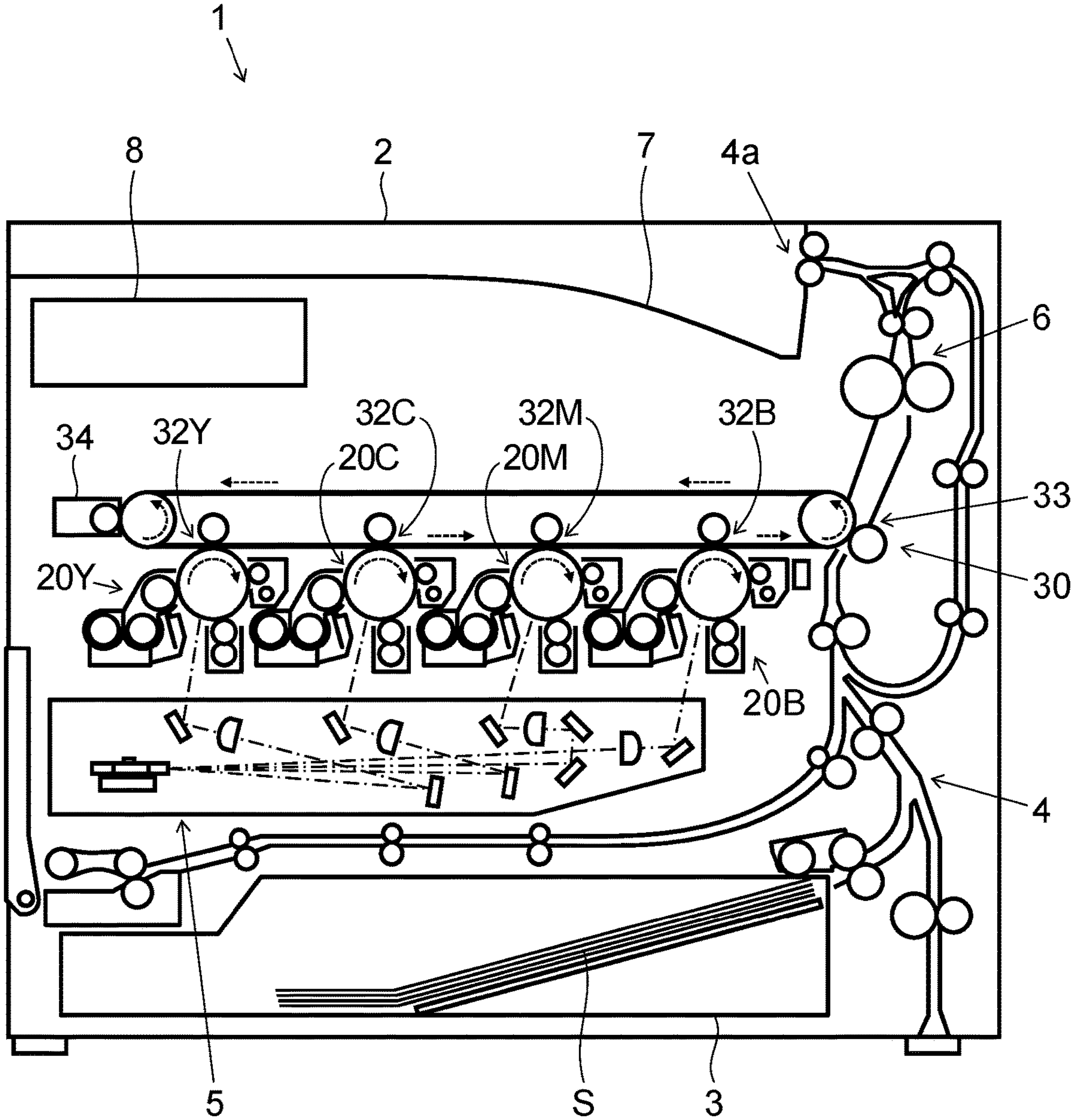
FIG. 1 is a schematic cross-sectional front view of an image forming apparatus according to one embodiment of the present disclosure.
Figure 2:
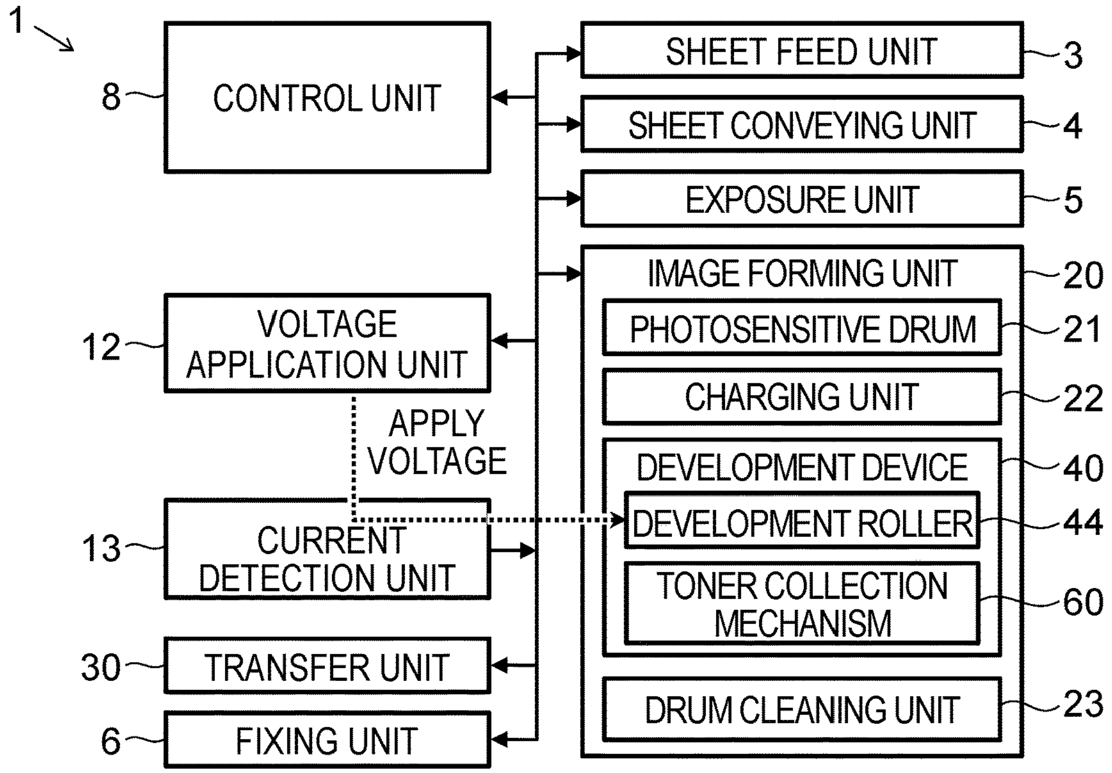
FIG. 2 is a block diagram illustrating a structure of the image forming apparatus of FIG. 1.
Figure 3:
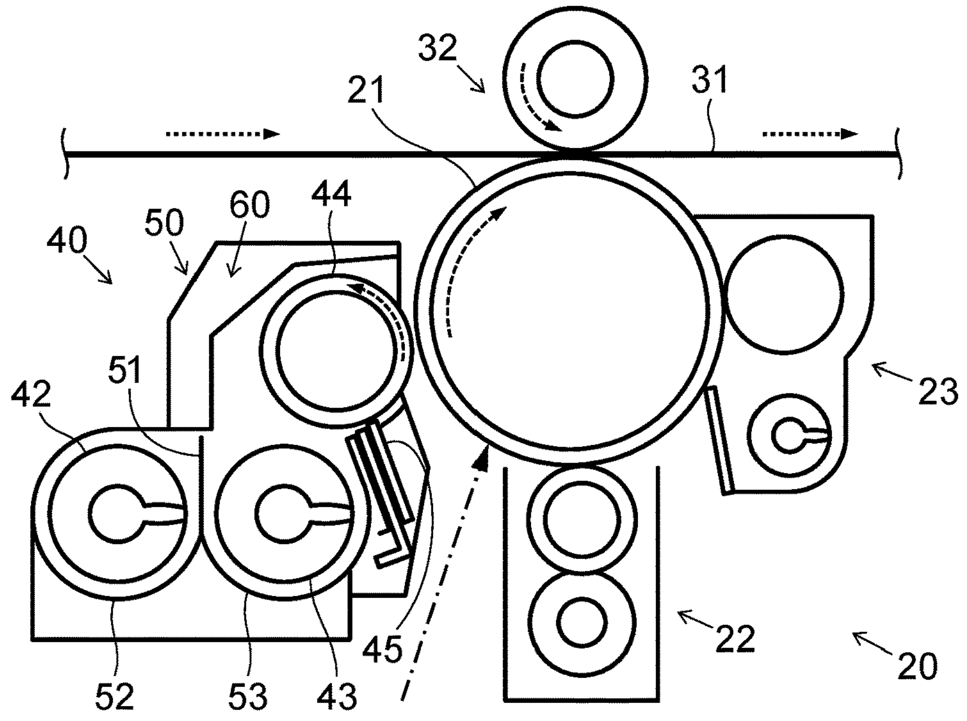
FIG. 3 is a schematic cross-sectional front view of an image forming unit and its vicinity in the image forming apparatus of FIG. 1.

FIG. 1 is a schematic cross-sectional front view of an image forming apparatus 1 of the embodiment. FIG. 2 is a block diagram illustrating a structure of the image forming apparatus 1 of FIG. 1. FIG. 3 is a schematic cross-sectional front view of an image forming unit 20 and its vicinity in the image forming apparatus 1 of FIG. 1. As an example, the image forming apparatus 1 of this embodiment is a tandem color printer that uses an intermediate transfer belt 31 to transfer a toner image onto a paper sheet S. For instance, the image forming apparatus 1 may be a so-called multifunction peripheral having functions such as printing, scanning (image reading), and facsimile transmission.

As illustrated in FIGS. 1, 2, and 3, the image forming apparatus 1 has a main body 2 equipped with a sheet feed unit 3, a sheet conveying unit 4, an exposure unit 5, the image forming unit 20, a transfer unit 30, a fixing unit 6, a sheet discharge unit 7, and a control unit 8.

The sheet feed unit 3 is disposed at a bottom of the main body 2. The sheet feed unit 3 stores a plurality of paper sheets S for printing, and separates and feeds the paper sheets S one by one when printing is performed. The sheet conveying unit 4 extends vertically along a side wall of the main body 2. The sheet conveying unit 4 conveys the paper sheet S fed from the sheet feed unit 3 to a secondary transfer unit 33 and the fixing unit 6, and further discharges the paper sheet S after fixing, to the sheet discharge unit 7 via a sheet discharge port 4*a*. The exposure unit 5 is disposed above the sheet feed unit 3. The exposure unit 5 emits a laser beam controlled based on image data toward the image forming unit 20.

The image forming unit 20 is disposed above the exposure unit 5 and below the intermediate transfer belt 31. The image forming unit 20 includes a yellow image forming unit 20Y, a cyan image forming unit 20C, a magenta image forming unit 20M, and a black image forming unit 20B. These four image forming units 20 have the same basic structure. Therefore, in the following description, the identification letters “Y”, “C”, “M”, and “B” indicating the colors may be omitted except a case where it is necessary to identify the color.

The image forming unit 20 includes a photosensitive drum (image carrier) 21 supported in a rotatable manner in a predetermined direction (clockwise direction in FIGS. 1 and 3). The image forming unit 20 further includes a charging unit 22, a development device 40, and a drum cleaning unit (a cleaning unit) 23, which are disposed around the photosensitive drum 21 in a rotation direction thereof. Note that a primary transfer unit 32 is disposed between the development device 40 and the drum cleaning unit 23.

The photosensitive drum 21 is formed in a cylindrical shape extending in a horizontal direction, and has a photosensitive layer made of amorphous silicon photosensitive body, for example, on the outer circumferential surface. The charging unit 22 charges the surface (the outer circumferential surface) of the photosensitive drum 21 at a predetermined potential. The exposure unit 5 exposes the outer circumferential surface of the photosensitive drum 21 charged by the charging unit 22, so as to form an electrostatic latent image of a document image on the outer circumferential surface of the photosensitive drum 21. The development device 40 supplies toner to this electrostatic latent image to develop the same, and forms a toner image. The four image forming units 20 form toner images of different colors. After the toner images are primarily transferred onto an outer circumferential surface of the intermediate transfer belt 31, the drum cleaning unit 23 removes the toner and the like remaining on the outer circumferential surface of the photosensitive drum 21 to clean the same. In this way, the image forming unit 20 forms the image (toner image) that is later transferred onto the paper sheet S.

The transfer unit 30 includes the intermediate transfer belt 31, the primary transfer units 32Y, 32C, 32M, and 32B, the secondary transfer unit 33, and a belt cleaning unit 34. The intermediate transfer belt 31 is disposed above the four image forming unit 20. The intermediate transfer belt 31 is an endless intermediate transfer body, which is supported in a rotatable manner in a predetermined direction (counterclockwise direction in FIG. 1), and onto which the toner images formed by the four image forming units 20 are primarily transferred sequentially in an overlapping manner. The four image forming units 20 are arranged in a row from upstream side to downstream side in a rotation direction of the intermediate transfer belt 31, as a so-called tandem system.

The primary transfer units 32Y, 32C, 32M, and 32B are disposed above the image forming units 20Y, 20C, 20M, and 20B of individual colors with the intermediate transfer belt 31 between them. The secondary transfer unit 33 is disposed on the upstream side of the fixing unit 6 in a sheet conveying direction of the sheet conveying unit 4, and on the downstream side of the four image forming units 20Y, 20C, 20M, and in the rotation direction of the intermediate transfer belt 31. The belt cleaning unit 34 is disposed on the downstream side of the secondary transfer unit 33 in the rotation direction of the intermediate transfer belt 31.

The primary transfer unit 32 transfers the toner image formed on the outer circumferential surface of the photosensitive drum 21 onto the intermediate transfer belt 31. In other words, the toner images are primarily transferred onto the outer circumferential surface of the intermediate transfer belt 31 by the primary transfer units 32Y, 32C, 32M, and 32B of individual colors. Further, when the intermediate transfer belt 31 rotates, the toner images of the four image forming units 20 are transferred onto the intermediate transfer belt 31 sequentially at predetermined timings in an overlapping manner, and hence the toner images of yellow, cyan, magenta, and black colors are overlaid to form a color toner image on the outer circumferential surface of the intermediate transfer belt 31.

The color toner image on the outer circumferential surface of the intermediate transfer belt 31 is transferred onto the paper sheet S that has been conveyed by the sheet conveying unit 4 in a synchronous manner, at a secondary transfer nip formed in the secondary transfer unit 33. After the secondary transfer, the belt cleaning unit 34 removes deposits such as the toner remaining on the outer circumferential surface of the intermediate transfer belt 31 to clean the same. In this way, the transfer unit 30 transfers (records) the toner image formed on the outer circumferential surface of the photosensitive drum 21 onto the paper sheet S.

The fixing unit 6 is disposed above the secondary transfer unit 33. The fixing unit 6 heats and presses the paper sheet S with the transferred toner image so as to fix the toner image to the paper sheet S.

The sheet discharge unit 7 is disposed above the transfer unit 30. The paper sheet S after the toner image is fixed, i.e. after printing is completed, is conveyed to the sheet discharge unit 7. The sheet discharge unit 7 allows the paper sheet (printed matter) to be taken out from above.

The control unit 8 includes a CPU, an image processing section, a storage section, and other electronic circuits and components (which are not shown in the drawings). The CPU controls operations of individual structural elements of the image forming apparatus 1 based on a control program and data stored in the storage section, so as to perform processing related to functions of the image forming apparatus 1. The sheet feed unit 3, the sheet conveying unit 4, the exposure unit 5, the image forming unit 20, the transfer unit 30, and the fixing unit 6 are instructed individually by the control unit 8 and cooperate with each other so as to print on the paper sheet S. The storage section is constituted of a combination of a nonvolatile storage device such as a program read only memory (ROM) and a data ROM, and a volatile storage device such as a random access memory (RAM).

In addition, the image forming apparatus 1 further includes a voltage application unit 12, and a current detection unit 13 as illustrated in FIG. 2. For instance, the voltage application unit 12 includes a power supply unit and a control circuit (which are not shown in the drawings). The voltage application unit 12 is electrically connected to a development roller (a developer carrier) 44 of the development device 40, which is described later. The voltage application unit 12 applies a development voltage to the development roller 44. The control unit 8 controls application timing, a voltage value, a polarity, application period, and the like of the development voltage applied to the development roller 44, via the voltage application unit 12.

The current detection unit 13 detects current flowing between the photosensitive drum 21 and the development roller 44 when the development voltage is applied to the development roller 44. The control unit 8 receives information about the current detected by the current detection unit 13, from the current detection unit 13.

Figure 4:
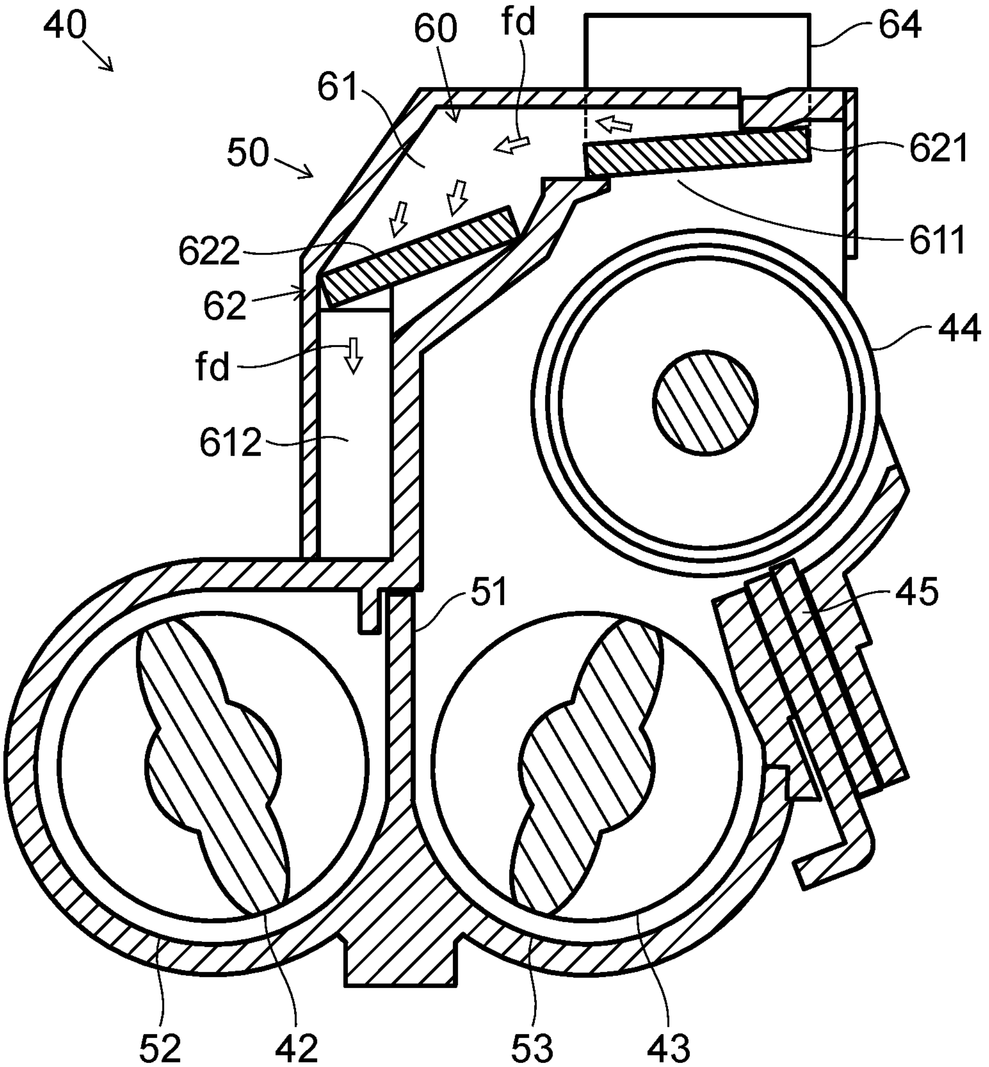
FIG. 4 is a vertical cross-sectional front view of a development device in the image forming unit of FIG. 3.
Figure 5:
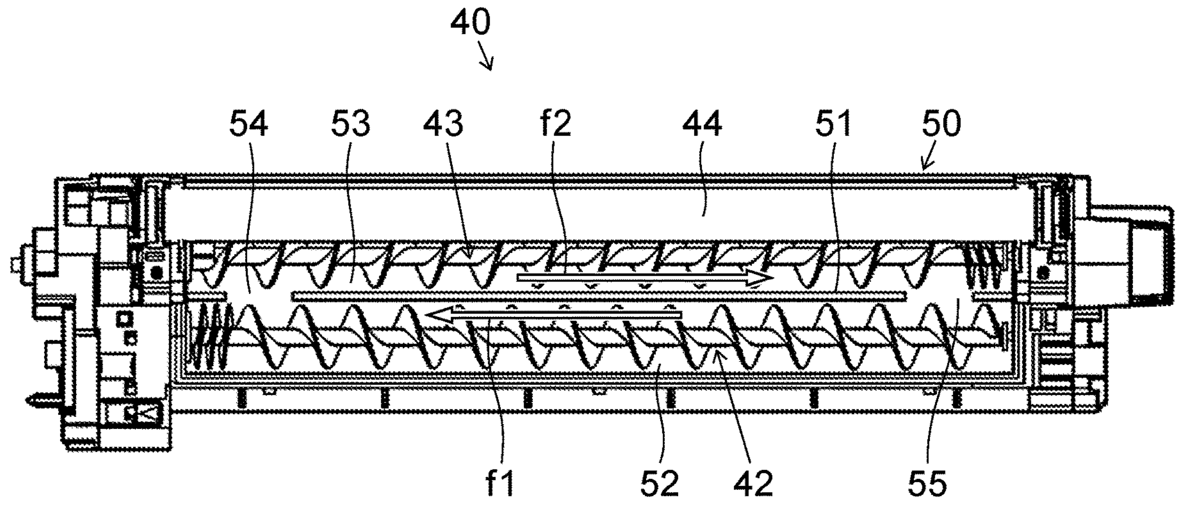
FIG. 5 is a horizontal cross-sectional plan view of the development device in the image forming unit of FIG. 3.
Figure 6:
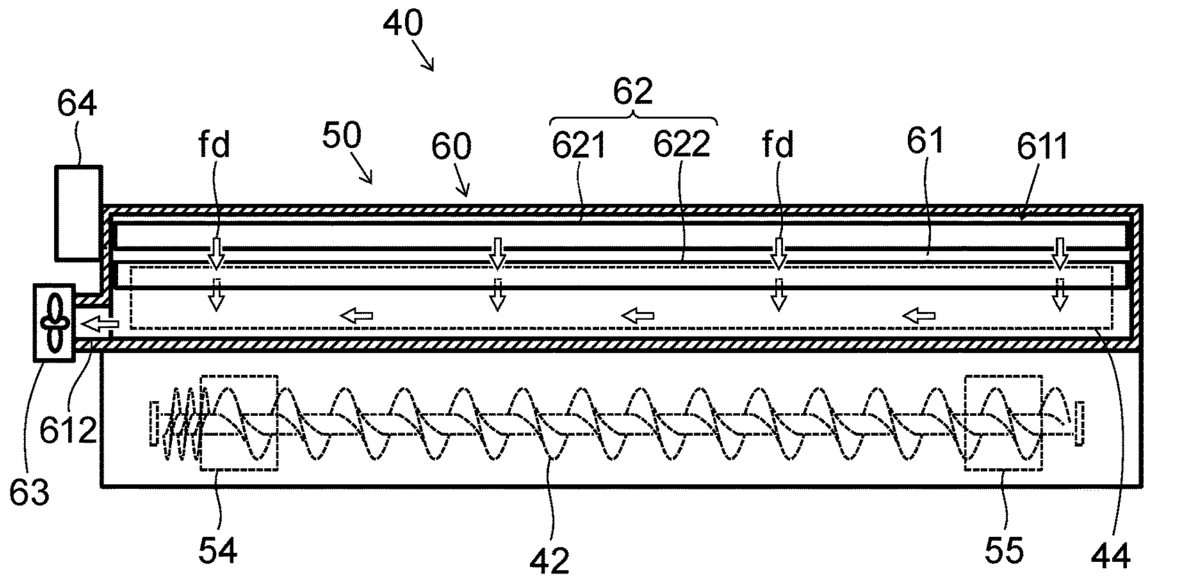
FIG. 6 is a vertical cross-sectional side view of the development device in the image forming unit of FIG. 3.

Next, a structure of the development device 40 is described with reference to FIGS. 4, 5, and 6 in addition to FIGS. 2 and 3. FIGS. 4, 5, and 6 are a vertical cross-sectional front view of the development device 40 in the image forming unit 20 of FIG. 3, a horizontal cross-sectional plan view of the same, and a vertical cross-sectional side view of the same. Note that the development devices 40 of individual colors have the same basic structure, and hence identification letters indicating colors and descriptions of individual structural elements are omitted. In addition, in this description, an "axial direction" means a rotation axial direction of each of the photosensitive drum 21, a first conveying member 42, a second conveying member 43, and the development roller 44, which extend in parallel with each other (in the thickness direction of paper of FIGS. 3 and 4, and in the left and right direction in FIGS. 5 and 6).

The development device 40 supplies toner to the outer circumferential surface of the photosensitive drum 21. The development device 40 can be attached and detached from the main body 2 of the image forming apparatus 1, for example. The development device 40 includes a development container 50, the first conveying member (developer conveying member) 42, the second conveying member (developer conveying member) 43, the development roller (developer carrier) 44, and a regulating member 45.

The development container 50 has an elongated shape extending in the axial direction of the photosensitive drum 21, and is disposed so that the longitudinal direction is the horizontal direction. In other words, the longitudinal direction of the development container 50 is parallel to the axial direction of the photosensitive drum 21. The development container 50 stores two-component developer containing toner and magnetic carrier, for example, as the developer containing toner to be supplied to the photosensitive drum 21. The developer may be magnetic one-component developer containing magnetic toner or nonmagnetic one-component developer, for example.

The development container 50 includes a partition 51, a first conveyance chamber 52, a second conveyance chamber 53, a first communication part 54, and a second communication part 55.

The partition 51 is disposed inside the development container 50 in a lower part. The partition 51 is disposed at substantially the center in a direction crossing the longitudinal direction of the development container 50 (the left and right direction in FIG. 4, the up and down direction in FIG. 5). The partition 51 is formed in a substantially plate shape extending in the longitudinal direction of the development container 50 and in the up and down direction. The partition 51 divides the inside of the development container 50 in the direction crossing the longitudinal direction.

The first conveyance chamber 52 and the second conveyance chamber 53 are formed inside the development container 50. The first conveyance chamber 52 and the second conveyance chamber 53 are formed by dividing the inside of the development container 50 by the partition 51. The first conveyance chamber 52 and the second conveyance chamber 53 are disposed in parallel with each other at substantially the same height.

The second conveyance chamber 53 is disposed adjacent to under the disposition area of the development roller 44 in the development container 50. The first conveyance chamber 52 is disposed apart more from the development roller 44 than the second conveyance chamber 53 in the development container 50. The first conveyance chamber 52 is connected to a developer replenishment tube (not shown), so that developer is replenished to the first conveyance chamber 52 through the developer replenishment tube. In the first conveyance chamber 52, the first conveying member 42 conveys the developer in a first direction f1. In the second conveyance chamber 53, the second conveying member 43 conveys the developer in a second direction f2 that is opposite to the first direction f1.

The first communication part 54 and the second communication part 55 are disposed outside the ends of the partition 51 in the longitudinal direction, respectively. The first communication part 54 and the second communication part 55 allow the first conveyance chamber 52 and the second conveyance chamber 53 to communicate to each other, in a direction crossing the longitudinal direction of the partition 51 (the left and right direction in FIG. 4, the up and down direction in FIG. 5), i.e., in a thickness direction of the partition 51 having a substantially plate shape. In other words, the first communication part 54 and the second communication part 55 allow the first conveyance chamber 52 and the second conveyance chamber 53 to communicate to each other at both end sides in the longitudinal direction thereof.

The first communication part 54 allows a downstream end of the first conveyance chamber 52 in the first direction f1 and an upstream end of the second conveyance chamber 53 in the second direction f2 to communicate to each other. In the first communication part 54, the developer is conveyed from the first conveyance chamber 52 to the second conveyance chamber 53. The second communication part 55 allows a downstream end of the second conveyance chamber 53 in the second direction f2 and an upstream end of the first conveyance chamber 52 in the first direction f1 to communicate to each other. In the second communication part 55, the developer is conveyed from the second conveyance chamber 53 to the first conveyance chamber 52.

The first conveying member 42 is disposed in the first conveyance chamber 52. The second conveying member 43 is disposed in the second conveyance chamber 53. The second conveying member 43 is adjacent to the development roller 44 and extends in parallel to the same. The first conveying member 42 and the second conveying member 43 are supported by the development container 50 in a rotatable manner about axes extending in parallel with the development roller 44 and in the horizontal direction. The first conveying member 42 and the second conveying member 43 have the same basic structure, in which a helical blade is formed on an outer periphery of a rotation shaft extending in the longitudinal direction of the development container 50.

In the first conveyance chamber 52, the first conveying member 42 stirs and conveys the developer in the rotation axial direction, i.e., in the first direction f1 from the second communication part 55 to the first communication part 54. In the second conveyance chamber 53, the second conveying member 43 stirs and conveys the developer in the rotation axial direction, i.e., in the second direction f2 from the first communication part 54 to the second communication part 55. In other words, the first conveying member 42 and the second conveying member 43 stir and convey the developer in directions opposite to each other, so as to circulate the developer in a predetermined circulation direction.

The development roller 44 is disposed above the second conveying member 43 in the development container 50, so as to face the photosensitive drum 21. The development roller 44 is supported by the development container 50 in a rotatable manner about an axis extending in parallel with an axis of the photosensitive drum 21. The development roller 44 includes a cylindrical development sleeve that rotates in the counterclockwise direction in FIGS. 3 and 4 for example, and a development roller magnetic pole fixed inside the development sleeve (which are not shown in the drawings).

A part of the outer circumferential surface of the development roller 44 is exposed from the development container 50, faces the photosensitive drum 21, and is close to the same. The outer circumferential surface of the development roller 44 carries the toner, which is supplied to the outer circumferential surface of the photosensitive drum 21 from the area facing the photosensitive drum 21. The development roller 44 carries the toner in the second conveyance chamber 53 of the development container 50 and supplies the toner to the photosensitive drum 21. In other words, the development roller 44 allows the toner in the second conveyance chamber 53 to adhere to the electrostatic latent image on the outer circumferential surface of the photosensitive drum 21, so as to form the toner image.

The regulating member 45 is disposed at the upstream side of the facing area between the development roller 44 and the photosensitive drum 21 in the rotation direction of the development roller 44. The regulating member 45 is close to and faces the development roller 44, so that a predetermined space is formed between the distal end of the regulating member 45 and the outer circumferential surface of the development roller 44. The regulating member 45 extends over the entire length of the development roller 44 in the axial direction. The regulating member 45 regulates a layer thickness of the developer (toner), which is carried on the outer circumferential surface of the development roller 44 and passes through a gap between the distal end of the regulating member 45 and the outer circumferential surface of the development roller 44.

When the first conveying member 42 and the second conveying member 43 rotate, the developer in the development container 50 passes through the first communication part 54 and the second communication part 55, so as to circulate between the first conveyance chamber 52 and the second conveyance chamber 53 in the predetermined circulation direction. At this time, the toner in the development container 50 is stirred and charged, and is carried on the outer circumferential surface of the development roller 44. The toner carried on the outer circumferential surface of the development roller 44 is regulated in layer thickness by the regulating member 45, and then is conveyed to the facing area between the development roller 44 and the photosensitive drum 21 by rotation of the development roller 44. When the predetermined development voltage is applied to the development roller 44, the toner carried on the outer circumferential surface of the development roller 44 moves to the surface (the outer circumferential surface) of the photosensitive drum 21 in the facing area, due to a potential difference to the potential of the outer circumferential surface of the photosensitive drum 21. In this way, the electrostatic latent image on the outer circumferential surface of the photosensitive drum 21 is developed by the toner.

Next, a more detailed structure of the development device 40 is described with reference to FIGS. 4, 5, and 6. Note that FIGS. 4 and 6 have arrows indicating air flow directions fd in a duct 61.

The development device 40 is equipped with a toner collection mechanism 60. The toner collection mechanism 60 includes the duct 61, a filter 62, an exhaust fan 63, and a vibration generating unit 64. The filter 62 includes a first filter 621 and a second filter 622.

The duct 61 is disposed adjacent to the second conveyance chamber 53. The duct 61 faces the photosensitive drum 21 via the disposition area of the development roller 44 in the development container 50, in a direction crossing the longitudinal direction of the development container 50 (the left and right direction in FIG. 4, in the thickness direction of paper of FIG. 6). The duct 61 is connected to the second conveyance chamber 53 at the upstream end in the air flow direction. The duct 61 allows air in the second conveyance chamber 53 to flow through. The duct 61 has an air inlet 611 and an air outlet 612.

The air inlet 611 is a connecting part of the duct 61 with the second conveyance chamber 53 and is disposed above the development roller 44. In other words, the air inlet 611 is positioned at the upstream end of the duct 61 in the air flow direction. The air inlet 611 opens over the entire length of the second conveyance chamber 53 in the longitudinal direction. The air inlet 611 is formed in a rectangular shape elongated in the longitudinal direction of the second conveyance chamber 53 for example, and faces the development roller 44. The air inlet 611 allows the inside of the second conveyance chamber 53 and the inside of the duct 61 to communicate to each other. The air inside the second conveyance chamber 53 passes through the air inlet 611 and flows into the duct 61.

The air outlet 612 is disposed in the back of the development container 50, for example. The air outlet 612 is positioned at the downstream end of the duct 61 in the air flow direction. The air inside the second conveyance chamber 53 passes through the air outlet 612 and is discharged from the duct 61. Note that the duct 61 may be connected to another exhaust air path at the air outlet 612, which has a fan in the main body 2.

The exhaust fan 63 is connected to the air outlet 612. When the exhaust fan 63 is driven, the air inside the second conveyance chamber 53 is forced to pass through the duct 61 and be discharged externally. In other words, the exhaust fan 63 makes the air inside the second conveyance chamber 53 flow outside through the duct 61.

The first filter 621 is disposed at the air inlet 611 that is the connecting part between the duct 61 and the second conveyance chamber 53. The first filter 621 has the same shape as the air inlet 611 and is formed in a rectangular shape elongated in the longitudinal direction of the second conveyance chamber 53, for example. The first filter 621 covers the air inlet 611. In other words, the first filter 621 faces the development roller 44. The first filter 621 is made of nonwoven fabric, for example, and collects toner contained in the air flowing from the second conveyance chamber 53 into the duct 61.

The second filter 622 is disposed on the downstream side of the first filter 621 in the air flow direction in the duct 61. The second filter 622 has the same cross-sectional shape as that of the duct 61 in a direction crossing the air flow direction inside the same, and is formed in a rectangular shape elongated in the longitudinal direction of the second conveyance chamber 53, for example. The second filter 622 covers an air flow cross section in the duct 61. The second filter 622 is made of nonwoven fabric, for example, and collects toner contained in the air that passes through the first filter 621 and flows in the duct 61.

TABLE 1

| | pressure loss (mmAq) |
|---|---|
| first filter | 0.42 |
| second filter | 4.50 |

Table 1 shows an example of performances of the first filter 621 and the second filter 622. When the upstream side static pressure and the downstream side static pressure are measured at an air flow rate of 10 cm/s, the pressure loss of the first filter 621 is 0.42 mmAq, while the pressure loss of the second filter 622 is 4.50 mmAq. Further, for example, both the 0.3 μm collection efficiency and the 8 μm collection efficiency have higher values in the second filter 622 than in the first filter 621.

According to the above structure of the filter 62, the first filter 621 can have a structure that does not collect much toner in the second conveyance chamber 53, so that it hardly cause clogging. Furthermore, the second filter 622 can prevent the toner from leaking to the outside of the development container 50.

The vibration generating unit 64 is disposed adjacent to the back surface of the development container 50, for example. The vibration generating unit 64 includes, for example, a vibration motor, a control substrate, and other electronic circuits and components (which are not shown in the drawings). A vibration weight is attached to an output shaft of the vibration motor, and the center of gravity of the vibration weight is shifted from the rotation axis of the output shaft.

The vibration generating unit 64 is connected to the first filter 621. When the vibration motor is driven, the vibration generating unit 64 vibrates the first filter 621. As the vibration generating unit 64 vibrates the first filter 621, it is possible to drop the toner collected by the first filter 621 and adhered to the first filter 621. Therefore, performance of the first filter 621 can be recovered, and it is possible to continuously prevent toner from scattering in the image forming apparatus 1.

Figure 7:
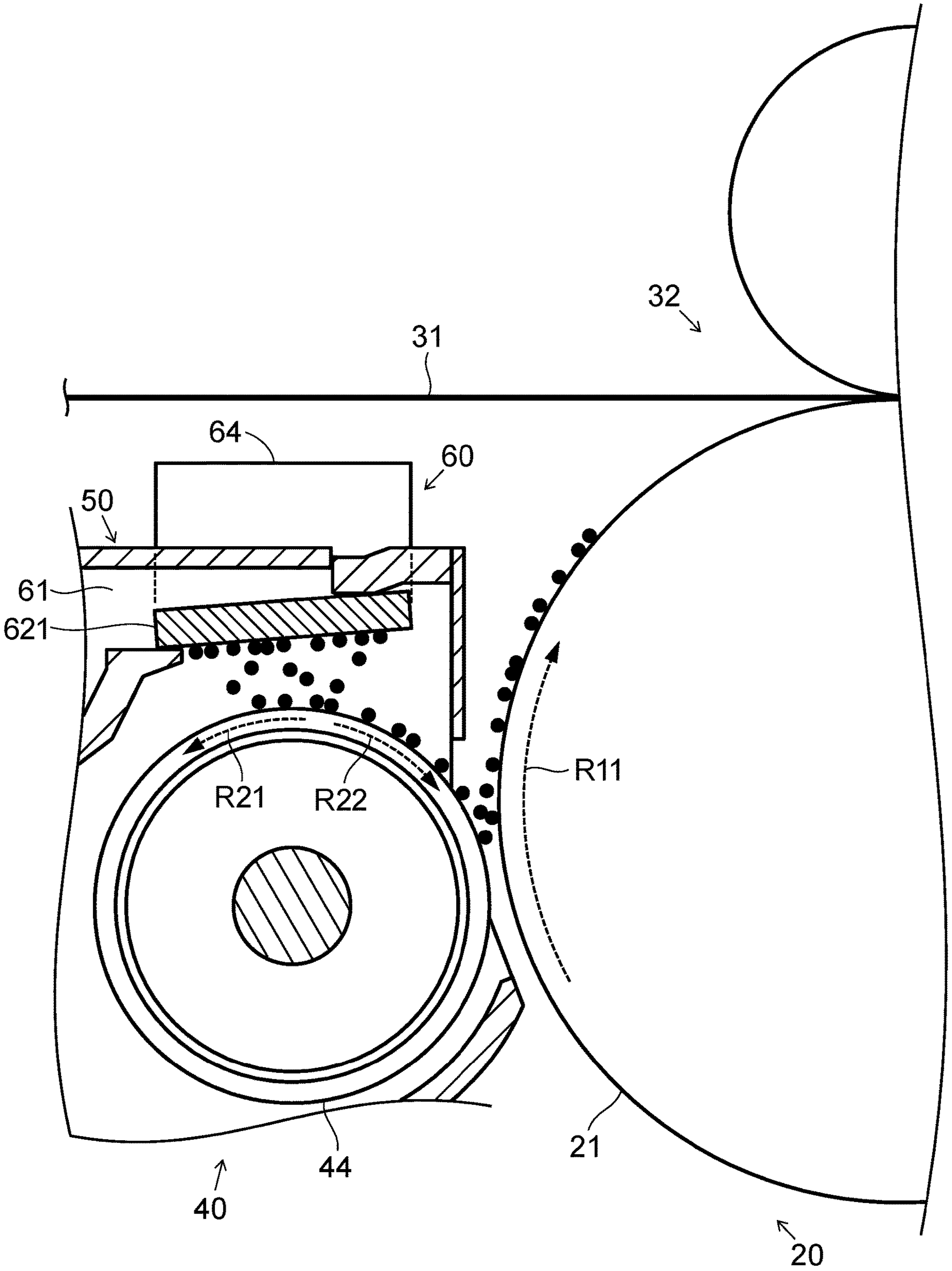
FIG. 7 is a partial enlarged cross-sectional front view of the image forming unit of FIG. 3 and its vicinity, and is an explanatory diagram of a scattered toner recovery mode.

Further, the control unit 8 of the image forming apparatus 1 can execute a scattered toner recovery mode in which the toner collected by the first filter 621 is recovered by the drum cleaning unit 23. FIG. 7 is a partial enlarged cross-sectional front view of the image forming unit 20 of FIG. 3 and its vicinity, and is an explanatory diagram of the scattered toner recovery mode.

Note that FIG. 7 shows a rotation direction R11 of the photosensitive drum 21 at the image forming time, a rotation direction R21 of the development roller 44 at the image forming time, and a rotation direction R22 of the development roller 44 at the scattered toner recovery mode, with arrow lines. The rotation direction R21 and the rotation direction R22 of the development roller 44 are opposite to each other. In addition, for convenience of description, the toner (black dots) dropped from the first filter 621 is illustrated in FIG. 7, below the first filter 621, on the outer circumferential surface of the development roller 44, and on the outer circumferential surface of the photosensitive drum 21, but in reality the toner has a size much smaller than the toner (black dots) illustrated in FIG. 7.

In the scattered toner recovery mode, the control unit 8 controls the vibration generating unit 64 to vibrate the first filter 621 at non-image forming time. Further, the control unit 8 controls the charging unit 22 and the voltage application unit 12 to generate a potential difference in the direction for the toner to move from the development roller 44 to the photosensitive drum 21, controls the development roller 44 to rotate in a reverse direction to that at the image forming time (in the direction R22 in FIG. 7), and controls the photosensitive drum 21 to rotate in the same direction as that at the image forming time (in the direction R11 in FIG. 7). In this way, scattered toner that has dropped from the first filter 621 and adhered to the outer circumferential surface of the development roller 44 is recovered by the drum cleaning unit 23 via the photosensitive drum 21 in the scattered toner recovery mode. Note that in the scattered toner recovery mode, a transfer bias is not applied in the primary transfer unit 32, so that the toner adhered to the outer circumferential surface of the photosensitive drum 21 will not move from the photosensitive drum 21 to the intermediate transfer belt 31.

[Example]

Next, an evaluation of toner scattering in the image forming apparatus 1 is described. In this evaluation, an image corresponding to a coverage rate of 20% was printed on 600,000 paper sheets S, and toner scattering in the image forming apparatus was checked. Evaluation conditions are shown in Table 2. As shown in Table 2, as comparison to the image forming apparatus 1 of Example of the present disclosure that can execute the scattered toner recovery mode, image forming apparatuses of Comparative example 1 and Comparative example 2 are prepared.

TABLE 2

| | with/without filter | vibration generating unit operation frequency | reverse rotation: development voltage (V) | reverse rotation: photo-sensitive drum surface potential (V) |
|---|---|---|---|---|
| Example | with | every 4,000 sheets | 150 | 20 |
| Comparative example 1 | without | non | non | non |
| Comparative example 2 | with | every 4,000 sheets | 150 | 250 |

The image forming apparatus 1 of Example includes the filter 62. Further, as for the image forming apparatus 1 of Example, the vibration generating unit 64 was activated every 4,000 printed sheets, and the development roller 44 was rotated in the reverse direction, with the development voltage of 150 V and the potential of the surface of the photosensitive drum 21 of 20 V. The image forming apparatus of Comparative example 1 is not equipped with the toner collection mechanism including the filter. Furthermore, the image forming apparatus of Comparative example 1 does not rotate the development roller in the reverse direction, and does not move toner from the development roller to the photosensitive drum. The image forming apparatus of Comparative example 2 includes a filter equivalent to that of Comparative example 1. Furthermore, as for the image forming apparatus of Comparative example 2, the vibration generating unit was activated every 4,000 printed sheets, and the development roller was rotated in the reverse direction, with the development voltage of 150 V and the potential of the surface of the photosensitive drum of 250 V. An evaluation result is shown in Table 3.

TABLE 3

| | toner scatter checking |
|---|---|
| Example | good |
| Comparative example 1 | not acceptable |
| Comparative example 2 | not acceptable |

For the toner scatter checking in Table 3, situation of the toner scattering inside the image forming apparatus was visually checked. As criterion of “toner scatter checking”, “good” is a case where toner scattering is not observed so that the inside of the apparatus is maintained clean, while "not acceptable" is a case where toner scattering is observed so that the inside of the apparatus is polluted by scattered toner.

As understood from Table 3, toner scattering occurred in the image forming apparatuses of Comparative examples 1 and 2. In contrast, toner scattering did not occur in the image forming apparatus 1 of Example of the present disclosure.

In this way, with the structure of the embodiment, the toner collection mechanism 60 for sucking and collecting scattered toner is formed in the development device 40, and the scattered toner collected by the filter 62 can be recovered by the drum cleaning unit 23 via the development roller 44 and the photosensitive drum 21. Therefore, with a downsized structure, toner scattering in the image forming apparatus 1 can be suppressed.

Further, the control unit 8 executes the scattered toner recovery mode every predetermined number of printed sheets. For instance, in the image forming apparatus 1 of the above Example, the control unit 8 executes the scattered toner recovery mode every 4,000 printed sheets. With this structure, scattered toner collected by the filter 62 can be regularly recovered by the drum cleaning unit 23 via the development roller 44 and the photosensitive drum 21. Therefore, it is possible to improve the effect of preventing toner from scattering in the image forming apparatus 1.

In addition, the developer that is used for forming the toner image is the two-component developer containing magnetic carrier and toner. It is known that the two-component developer can easily cause toner scattering from the development container 50. Therefore, by executing the scattered toner recovery mode described above in the image forming apparatus 1 using the two-component developer, it is possible to more effectively suppress toner scattering in the image forming apparatus 1.

In addition, the photosensitive drum 21 has the photosensitive layer made of the amorphous silicon photosensitive body on the outer circumferential surface. It is known that the photosensitive layer made of the amorphous silicon photosensitive body has a high dielectric constant and a low toner charge amount. If the toner charge amount is low, the toner scattering from the development container 50 can easily occur. Therefore, by executing the scattered toner recovery mode described above in the image forming apparatus 1 using the photosensitive drum 21 having the amorphous silicon photosensitive body, it is possible to more effectively suppress toner scattering in the image forming apparatus 1.

Although the embodiment of the present disclosure is described above, the present disclosure is not limited to this embodiment and can be variously modified for implementation, within the scope of the disclosure without deviating from the spirit thereof.

For instance, in the above embodiment, the image forming apparatus 1 is a so-called tandem type image forming apparatus for color printing, in which a plurality of colors of images are overlaid and formed sequentially, but this type is not a limitation. The image forming apparatus may be a non-tandem type image forming apparatus for color printing or an image forming apparatus for monochrome printing.

What is claimed is:

1. An image forming apparatus comprising:

an image carrier having an outer circumferential surface on which an electrostatic latent image is formed;

a charging unit that charges the outer circumferential surface of the image carrier;

a cleaning unit that cleans the outer circumferential surface of the image carrier;

a development device including a development container that stores developer containing toner to be supplied to the image carrier, a developer conveying member that is supported in a rotatable manner in a conveyance chamber of the development container, and stirs and conveys the developer so as to circulate the same, and a developer carrier that faces the image carrier and is supported in a rotatable manner by the development container so as to supply the toner in the conveyance chamber to the image carrier;

a voltage application unit that applies a development voltage to the developer carrier; and a control unit that controls the image carrier, the charging unit, the cleaning unit, the development device, and the voltage application unit, wherein the development device includes a toner collection mechanism having a duct that is connected to the conveyance chamber and allows air in the conveyance chamber to flow through, a filter that is disposed at a connecting part between the duct and the conveyance chamber above the developer carrier so as to collect the toner flowing into the duct from the conveyance chamber, an exhaust fan that makes the air in the conveyance chamber flow outside via the duct, and a vibration generating unit that vibrates the filter, and the control unit is capable of executing a scattered toner recovery mode at non-image forming time, in which the vibration generating unit vibrates the filter, the charging unit and the voltage application unit are controlled to generate a potential difference in the direction for the toner to move from the developer carrier to the image carrier, the developer carrier is rotated in a reverse direction to that at image forming time, and the image carrier is rotated in the same direction as that at the image forming time, so that scattered toner, which has dropped from the filter and adhered to the outer circumferential surface of the developer carrier, is recovered by the cleaning unit via the image carrier.

2. The image forming apparatus according to claim 1, wherein the control unit executes the scattered toner recovery mode every predetermined number of printed sheets.

3. The image forming apparatus according to claim 1, wherein the developer is two-component developer containing magnetic carrier and toner.

4. The image forming apparatus according to claim 1, wherein the image carrier has a photosensitive layer made of amorphous silicon photosensitive body on the outer circumferential surface.

5. The image forming apparatus according to claim 1, wherein the filter includes:

a first filter that covers an air inlet, which opens over the entire length of the conveyance chamber in the longitudinal direction, so as to allow the inside of the conveyance chamber and the inside of the duct to communicate to each other, and a second filter disposed on the downstream side of the first filter in an air flow direction in the duct, so as to cover an air flow cross section in the duct.

* * * * *